Jan. 26, 1971  I. P. ECHEAGARAY  3,559,060
PERMANENT MAGNET FOR USE IN A DRIVE MECHANISM FOR AN INSTRUMENT
Filed Nov. 14, 1968

INVENTOR.
IGNACIO P. ECHEAGARAY
BY
Young, Flynn & Tarolli
ATTORNEYS

United States Patent Office 3,559,060
Patented Jan. 26, 1971

3,559,060
PERMANENT MAGNET FOR USE IN A DRIVE MECHANISM FOR AN INSTRUMENT
Ignacio P. Echeagaray, R.F.D. 1, Rte. 10 East, Oberlin, Ohio 44074
Filed Nov. 14, 1968, Ser. No. 775,712
Int. Cl. G01r 1/16
U.S. Cl. 324—151                    5 Claims

ABSTRACT OF THE DISCLOSURE

The present invention of a novel permanent magnet configuration for use in a measuring instrument is disclosed in a drive mechanism for driving a pen in direct proportion to control signals. The design of the permanent magnet is such that it encloses the pole pieces in a cavity located therein effecting an increase in efficiency of the magnetic flux. The magnet configuration also effectively encloses the gap within the magnet to effect and increase the sensitivity of the drive mechanism. In the illustrated embodiment the pen records the magnitude and direction of the control signals on a moving web of paper. The control signals are electrical currents which flow through a coil supported for oscillatory movement in the air gap between pole pieces of the permanent magnet. The control currents set up polarities in the coil which are repelled by the like poles of the magnet and attracted by unlike poles thereof to move the coil to a position corresponding to the magnitude and direction of the control current. The coil is drivingly connected to the pen and movement of the pen records a line on the paper which indicates the magnitude and direction of the current.

---

It is an important object of the present invention to provide a new and improved permanent magnet configuration for use in a highly sensitive and accurate drive mechanism for a measuring instrument having a rotatable coil movable in response to electrical signals acting thereon disposed within the permanent magnet and wherein the magnet configuration is operable to provide a large number of lines of flux across the air gap of the magnet.

Another object of the present invention is the provision of a new and improved permanent magnet configuration for use in a drive mechanism for an instrument, as noted in the preceding paragraph, wherein a portion of the permanent magnet encloses at least a part of the ends of the pole pieces of the permanent magnet.

A further object of the present invention is to provide a new and improved permanent magnet configuration for use in a drive mechanism for an instrument which is of a relatively simple design and which includes a rotatable coil drivingly connected to an instrument to drive the instrument in response to the application of control currents directed through the coil, and wherein the magnet includes spaced plate portions interconnected by a tubular portion which encloses the area between the plate portions to provide a closed chamber within which the pole pieces, iron core, and movable coil are supported.

These and other objects will become apparent from the following description of a preferred embodiment of the invention taken in conjunction with the accompanying drawings and in which.

The present invention provides a new and improved permanent magnet configuration for use in a drive mechanism in an electric meter movement operable to indicate the magnitude and polarity of a control signal or for use in the drive mechanism of a direct current motor or generator. Although the preferred embodiment discloses the magnet configuration utilized in a drive mechanism in an electric meter movement and specifically in a pen recorder for driving a pen which records the magnitude and polarity of a signal voltage on a moving web of paper, it should be realized that the drive mechanism is easily converted to a transducer which could be used to indicate the magnitude of other variants rather than voltage, i.e., temperature, pressure, liquid levels, etc., in which the variants could be used to effect a change in potential across the rotatable coil of the drive mechanism. Moreover, it should be realized that the permanent magnet configuration could also be easily adapted for use with advantage in direct current motors or generators.

The illustrated embodiment illustrates a permanent magnet configuration for use in a highly sensitive drive mechanism for a pen. The pen is moved by a torque transmitting system including a stationary permanent magnet having spaced pole pieces, an iron core and a movable electromagnet in the form of a coil coupled to the pen and movable in the air gap between the pole pieces of the permanent magnet. Control currents are directed to the coil and set up magnetic polarities therein which are repelled by like poles of the permanent magnet and at the same time attracted by unlike poles of the permanent magnet causing movement of the coil. The coil oscillates in opposite directions between a neutral position which is the set position of the coil when no current is flowing in the coil and angularly spaced positions when current is flowing in the coil. Mounted on either end of the coil are coil springs which bias the coil toward its neutral position. The angular extent of movement of the coil from its neutral position is proportionally related to the magnitude of the current flowing through the coil and the biasing force of the coil springs. The direction of movement of the coil from its neutral position depends on the polarity established in the coil by the particular direction in which current is flowing therethrough. The coil is operatively connected to the pen so that the pen likewise moves proportionally to the magnitude and direction of the current flowing through the coil. The pole pieces, iron core and coil are enclosed by the permanent magnet and provide a compact and highly sensitive drive mechanism. By enclosing the parts within the magnet, a large number of lines of flux are provided across the air gap of the pole pieces apparently due at least in part to a reduction in flux leakage.

Figure 1:
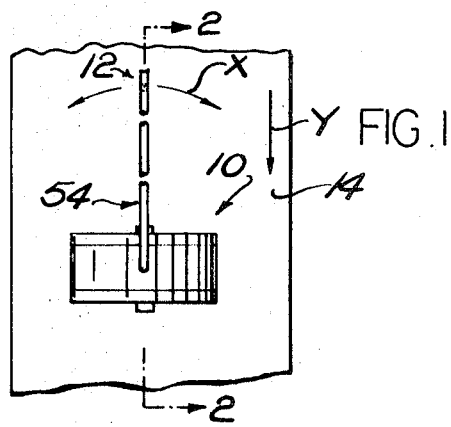
FIG. 1 is a plan view of the drive mechanism embodying the present invention.
Figure 2:
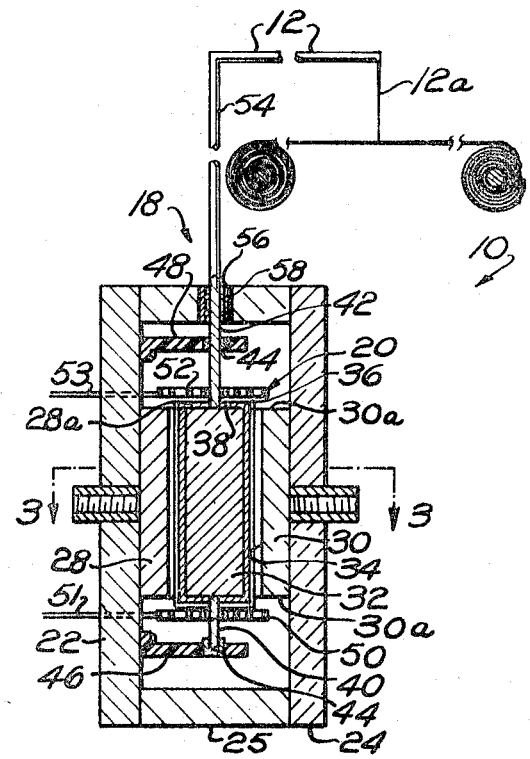
FIG. 2 is a sectional view taken substantially along line 2—2 of FIG. 1.

Referring to the drawings, a drive mechanism 10 is shown for driving a pen 12 in proportion to control signals received by the drive mechanism. The drive mechanism 10 may be used with an apparatus which includes a mechanism for generating control signals which are to be recorded on a moving web of paper 14. The drive mechanism may be supported relative to the paper in any suitable manner so that the stylus 12a of the pen 12 is operable to engage the paper 14. Upon receipt of a control signal from the apparatus, the drive mechanism 10 moves the pen 12 in an arcuate path in the directions indicated by arrow X in FIG. 1 which is generally transversely of the direction of movement of the paper 14 indicated by arrow Y. When the pen 12 engages the paper 14, the relative movements of the pen 12 and paper 14 produce an output line upon the paper 14 which records graphically the magnitude and direction of the control signal received by the drive mechanism 10.

The control signal can be generated by any type of apparatus such as a seismograph or a cardiograph which produces electrical output signals such as electrical currents which are to be recorded for study.

The drive mechanism 10 includes a permanent magnet 18 which encloses a torque transmitting unit 20. The magnet 18 comprises spaced plate portions 22 and 24 interconnected by a tubular portion 25 which encloses the area between plate portions 22 and 24 to define a chamber 26. The plate portions 22 and 24 are preferably made of soft iron. While the material selected for the tubular portion 25 is preferably of the type known to maintain its magnetic strength indefinitely such as cobalt alloy and nickel steel, and ceramic type magnets. The plate portions 22 and 24 are detachably connected by any suitable means such as bolts 27 to the tubular portion 25 after the torque transmitting unit 20 has been assembled in chamber 26.

The torque transmitting unit 20 includes spaced pole pieces 28 and 30 supported by the plate portions 22 and 24, respectively, within the closed chamber 26. The pole pieces are made of soft iron and have end portions 28a and 30a and opposing portions 28b and 30b of the usual contour to cooperate with a cylindrical iron core 32, also preferably constructed of soft iron. The iron core 32 is suitably supported by brackets 33 so that the outer surface thereof is spaced a predetermined distance from the respective opposing surfaces of the pole pieces to provide a predetermined small air gap 34 therebetween. The core 32 reduces the magnetic reluctance of the magnetic circuit and therefore increases the flux across the air gap 34. The air gap 34 around the iron core 32 is made as small as possible and yet provides sufficient clearance for mounting a movable coil 36 therein.

The coil 36 comprises a selected number of turns of very fine conductor wire. The turns of wire which are insulated from the housing are supported for movement by a rectangular frame or bobbin 38. The bobbin 38 is preferably constructed from electrically insulating material and has trundles 40, 42 extending axially from opposite sides thereof which are mounted for rotation in suitable bearings, such as jewel bearings 44. The bearings 44 are supported in brackets 46 and 48 fixed to the plate portion 22.

Figure 3:
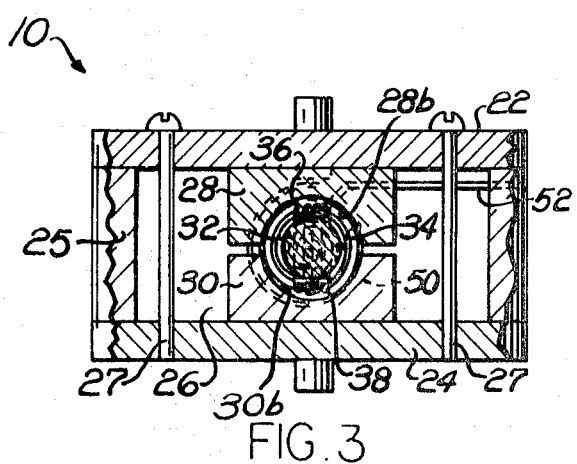
FIG. 3 is a sectional view taken substantially along line 3—3 of FIG. 2 illustrating the coil in its neutral position.
Figure 4:
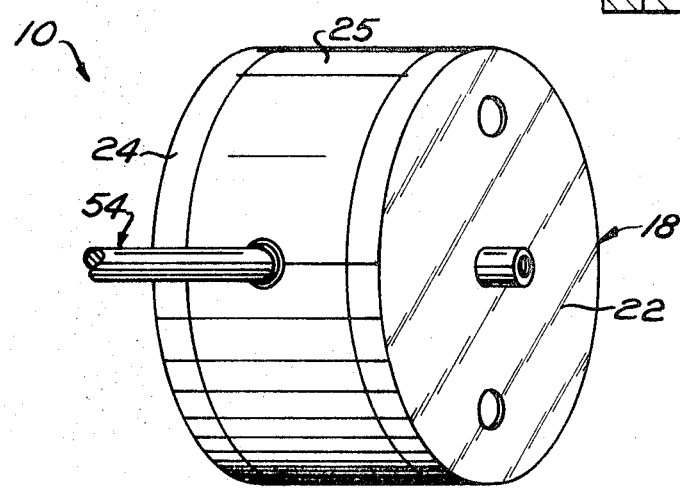
FIG. 4 is a perspective view of the drive mechanism shown in FIG. 1.

The bobbin is biased to a neutral position as illustrated in FIG. 3 by oppositely coiled springs 50, 52. The springs 50, 52 are connected to the trundles 40, 42 and to the coil 36. The springs 50, 52 extend through portion 22 of magnet 18 and are anchored thereby to exert opposite torques on the bobbin 38 to position the bobbin in a neutral position in gap 34 which is the position illustrated in FIG. 3. The coil 36 is electrically insulated by the bobbin 38.

The coil springs 50, 52 which extend through magnet 18 operate as conductors to deliver control signals to the coil 36. Suitable leads 51, 53 are connected to springs 50 and 52 for connecting the springs to the current producing means of the apparatus with which the drive mechanism 10 is associated.

When current flows through the coil 36, the coil becomes a movable electromagnet and a polarity is established in the coil according to the direction of flow of current therethrough. If current flows through the coil 36 in one direction, a polarity is established that will cause the coil 36 to be repelled by the like poles of the permanent magnet 18 and be attracted by unlike poles thereof to move the coil 36 from the neutral position. When current flows in the opposite direction, an opposite polarity is set up by the coil 36 and the coil will rotate in the opposite direction from its neutral position. The extent of coil movement is substantially directly proportional to the magnitude of the current flowing through the coil. When current flow to the coil stops, the coil is returned to its neutral position by springs 50 and 52. The springs 50 and 52 are matched so that they exert equal forces in the opposite directions on the bobbin 38 and automatically compensate for expansion or contraction due to heating and cooling of the springs. Although both springs 50, 52 exert linear resistance to rotation of the bobbin 38 in the described embodiment, it is possible for certain applications to use a mechanism exerting a non-linear spring resistance to the coil movement, but the springs used even in the non-linear mechanism would still remain linear as an inherent property.

Bobbin movement is transmitted to pen 12 through a shaft 54. Shaft 54 is threaded onto the end of trundle 42 which extends through an opening 56 in tubular portion 25 of magnet 18. A suitable bearing 58 may be mounted in opening 56 to provide support for trundle 42 and shaft 54. In the illustrated embodiment, the pen 12 is threaded onto the opposite end of shaft 54. However, any suitable connection may be provided to interconnect coil 36 and pen 12.

It should be apparent that when the bobbin 38 moves in response to current flow through the coil 36, the pen 12 is moved transversely of the direction of movement of the web of paper 14 and makes a line on the paper which indicates the direction and magnitude of the control signal. The lateral extent of the line made by the pen accurately reflects the current flowing through the coil since, as explained above, movement of the coil is substantially directly proportional to the current.

The greater the number of lines of flux across air gap 34, the more sensitive, accurate and responsive is the drive mechanism 10. The iron core 32 reduces the length of the air gap 34 and reduces the magnetic reluctance of the magnetic circuit to thereby increase the lines of flux across air gap 34. The enclosed magnetic configuration of the illustrated embodiment exclusively increases the efficiency of the magnetic flux upon the coil 36. It is believed that enclosing the torque transmitting unit 20 within the permanent magnet allows the torque transmitting unit to function unaffected by external inductive fields which are operable to decrease the accuracy of the torque transmitting unit. As a result, the drive mechanism 10 is very sensitive and accurate and will react to very small currents introduced into the coil 36 which will be recorded by the pen 12 on the paper 14. Furthermore, the novel magnet, according to the present invention, provides a very compact drive mechanism which protects the torque transmitting unit 20 from dust and other deleterious foreign matter.

Although the illustrated embodiment of the present invention has been described in considerable detail, it is intended to cover all adaptations and modifications thereof such as the use of the permanent magnet configuration in a transformer wherein substitution of laminated iron in place of the illustrated tubular portion 25 of the magnet structure and the substitution of a laminated iron piece placed on the longitudinal axis of the tubular portion 25 so that the ends of the iron piece engage the center of the plate portions 22 and 24 could be used to produce an efficient transformer as an extension of the low leakage magnetic configuration illustrated herein.

Having described my invention, I claim:

1. A permanent magnet for use in a drive mechanism having an iron core and a conductor coil, the conductor coil supported for movement and movable in response to current flowing therethrough, said permanent magnet formed to minimize flux leakage therefrom and comprising spaced apart plate portions disposed parallel to each other, a tubular portion interconnecting said plate portions and which cooperates with said plate portions to define a closed chamber between said plate portions, said chamber defining a housing in which said drive mechanism is located, each of said parallel plate portions having a surface portion thereon which cooperates with said tubular portion to in part define said chamber, said surface portion of one of said plate portions having a first polarity and said surface portion of said other plate portion having a second polarity which is opposite from said first polarity so that the neutral axis of the lines of magnetic force is disposed parallel to said plate portions and located midway therebetween, said tubular portion being polarized so that the end of said tubular portion cooperating with said surface portion of said one plate portion has said first polarity and the end of said tubular portion cooperating with said surface portion of said other plate portion has said second polarity which is opposite from said first polarity so that the neutral axis of the magnetic lines of force is disposed perpendicular to the axis of said tubular portion, and spaced apart pole pieces, one of which is located on each of said surface portions of said plate portions within said closed chamber, each of said spaced apart pole pieces having the same polarity as the surface portion upon which said pole pieces are located, said permanent magnet having a neutral axis of the magnetic lines of force which is disposed midway between said spaced apart pole pieces, and wherein the iron core is located between said pole pieces and cooperates therewith to define an air gap in which the conductor coil is located for movement co-axially with the neutral axis of the magnetic lines of force.

2. In a drive mechanism for activating an instrument in response to a control current, a permanent magnet comprising first and second parallel spaced apart plate portions, a tubular portion interconnecting said plate portions and which cooperates with said plate portions to define a closed chamber between said plate portions, said first plate portion forming one end of said chamber and said second plate portion forming the other end of said chamber, said first plate portion having a first polarity and said second plate portion having a second polarity which is opposite from said first polarity so that the neutral axis of the magnetic lines of force in said chamber is disposed midway between said parallel spaced apart plate portions, and perpendicular to the axis of said tubular member, said one end of said chamber being of said first polarity and said other end of said chamber being of said second polarity, first and second spaced apart pole pieces located in said chamber with said first pole piece disposed on said first plate portion and said second pole piece disposed on said second plate portion, said first pole piece being of said first polarity and said second pole piece being of said second polarity, an iron core located between said pole pieces with the axis thereof parallel to said neutral axis of the magnetic lines of force and perpendicular to the axis of said tubular member, said iron core being spaced from said pole pieces to define an air gap between said iron core and said pole pieces, and a conductor coil supported in said air gap and movable in response to current flowing therethrough.

3. In a drive mechanism as defined in claim 2 further including a bobbin for supporting said coil, said bobbin having trunnions extending axially therefrom and which support said coil for movement in said air gap.

4. A drive mechanism as defined in claim 3 further including a marking instrument, means operatively connecting said instrument to said bobbin so as to be moved thereby, and spring means biasing said bobbin to a neutral position.

5. A drive mechanism as defined in claim 4 further including means providing a moving mark recording medium in contact with said marking instrument whereby relative movement of said marking instrument and said medium forms indicia on said medium which indcates the magnitude and direction of the current flowing through said coil.

References Cited
UNITED STATES PATENTS 2,275,880  3/1942  Arey _____ 324—151UX ALFRED E. SMITH, Primary Examiner U.S. Cl. X.R.

335—304